Patented Dec. 29, 1925.

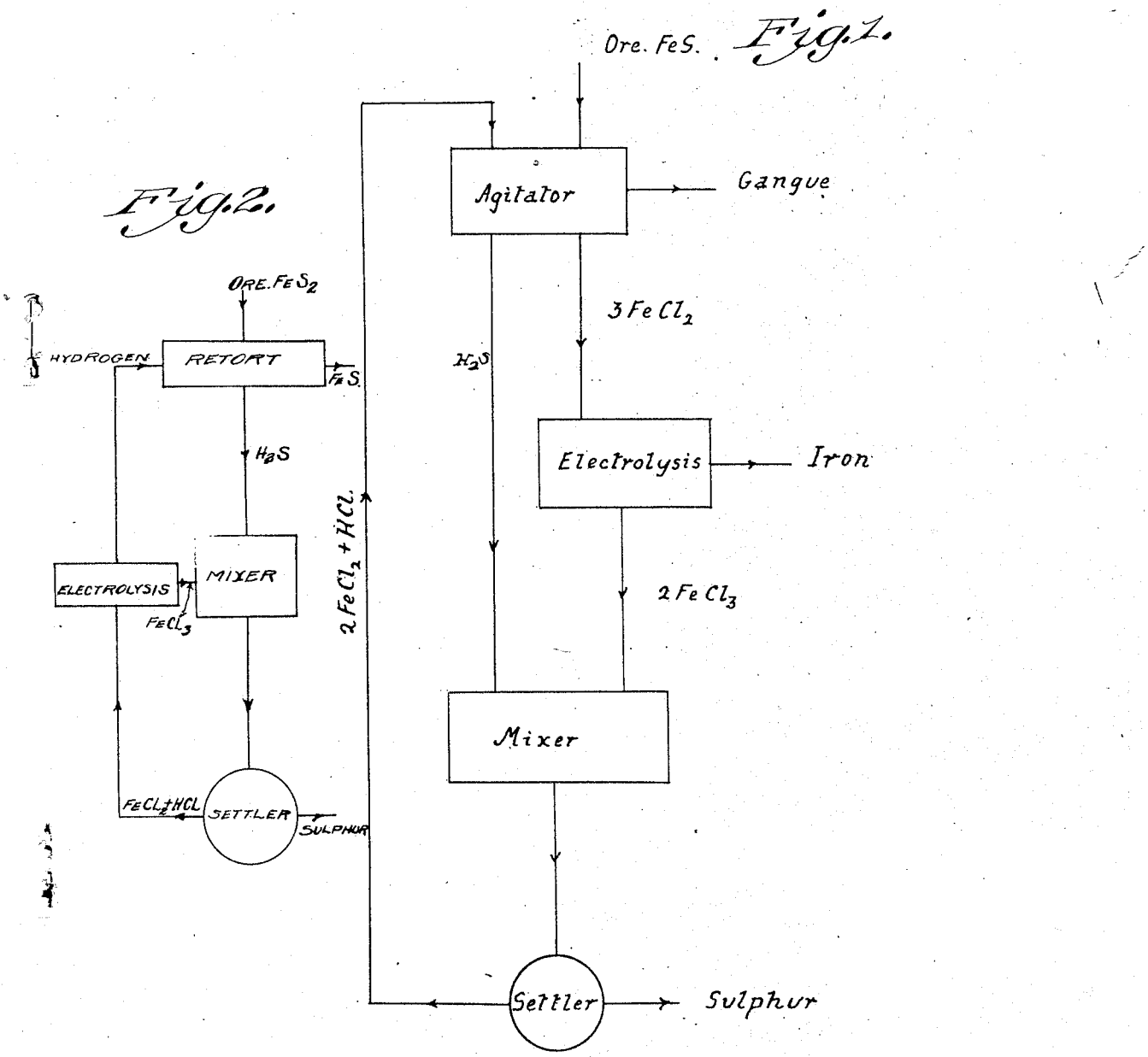

1,567,916

UNITED STATES PATENT OFFICE.

HARTWELL CONDER, OF STRAHAN, TASMANIA, AUSTRALIA.

PROCESS FOR RECOVERING IRON AND SULPHUR FROM SULPHIDE ORES.

Application filed March 20, 1923. Serial No. 626,367.

*To all whom it may concern:*

Be it known that I, HARTWELL CONDER, a subject of the King of Great Britain, and residing at Strahan, in the State of Tasmania and Commonwealth of Australia, have invented an Improved Process for Recovering Iron and Sulphur from Sulphide Ores, of which the following is a specification.

My improved process for recovering iron and sulphur from sulphide ores, consists, firstly, in producing iron sulphide from said ores; secondly, in subsequently treating the iron sulphide so produced to obtain sulphur and iron therefrom; and thirdly, in the use of sulphuretted hydrogen for regenerating the hydrochloric acid used in the process, and thus greatly reducing the cost thereof.

The accompanying drawing is a flow sheet diagrammatically illustrating the plants and processes of the invention, Figure 1 being such as applied to the recovery of sulphur, and Fig. 2, such as applied to the recovery of iron and sulphur.

Ores of pyritic character, carrying a higher proportion than one atom of sulphur to one of iron, are either not soluble or only partly soluble in dilute hydrochloric acid. According to my invention, such ores are crushed to a sufficient fineness to enable them to pass through a ten inch mesh or less, and are then placed in a closed retort provided with an inlet and also an outlet pipe. It is preferred that the ores, when in the retort, should be mechanically rabbled in any approved manner. The retort is heated by any suitable means and hydrogen gas is then passed over the ore in the retort, thereby converting the sulphide ore to ferrous sulphide. Sulphuretted hydrogen gas is produced by the union of the hydrogen with the excess of sulphur in accordance with the equation:—

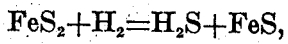
$$FeS_2 + H_2 = H_2S + FeS,$$

or

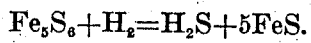
$$Fe_5S_6 + H_2 = H_2S + 5FeS.$$

It is to be noted that similar action takes place with sulphide ores containing copper. The sulphur is recovered from the sulphuretted hydrogen gas either (1) by subjecting the gas delivered from the outlet pipe of the retort to electric discharge produced by any suitable apparatus; or (2) by bringing the sulphuretted hydrogen gas into contact with a solution of ferric chloride either in towers or revolving drums.

The so treated ore, which has been brought to the condition of ferrous sulphide (or ore which, in its natural state, carries only a small atomic excess of sulphur over iron), is then treated in a closed vessel, with a solution of ferrous chloride and hydrochloric acid. The ferrous sulphide is thereby dissolved, yielding ferrous chloride and sulphuretted hydrogen gas, in accordance with the equation:—

$$2FeCl_2 + 2HCl + FeS = 3F_2Cl_2 + H_2S.$$

The solution of ferrous chloride is separated by settling or filtration from any residue, and then subjected to electrolysis in diaphragm cells, by means of which the ferrous chloride is converted into ferric chloride and iron is deposited. The sulphuretted hydrogen gas produced is then brought into contact with the ferric chloride solution formed by the electrolysis, either in revolving drums, or in towers, or by other suitable apparatus, with the result that sulphur is precipitated, and the solution of ferric chloride is converted into one containing ferrous chloride and hydrochloric acid, in accordance with the equation:—

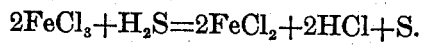
$$2FeCl_3 + H_2S = 2FeCl_2 + 2HCl + S.$$

The sulphur is then separated by settling or filtration, and the solution is used to dissolve more ferrous sulphide, the process thus becoming cyclic.

I claim:—

1. In a process for recovering iron and sulphur from sulphide ores, crushing the ore, subjecting same to heat, while in a closed retort, passing hydrogen gas in contact with the ore in said retort to convert the sulphide ore to ferrous sulphide, recovering the sulphur from the sulphuretted hydrogen gas produced.

2. In a process for recovering iron and sulphur from sulphide ores, as claimed in claim 1 and in which the ore has been brought substantially to the condition of ferrous sulphide, treating same in a closed vessel with a solution of ferrous chloride and hydrochloric acid, separating the resultant solution of ferrous chloride, subjecting same to electrolysis to convert it into ferric chloride and to deposit iron, bringing the sulphuretted hydrogen gas produced into contact with the ferric chloride solution to precipitate the sulphur and to convert the ferric chloride solution into one containing ferrous chloride and hydrochloric acid, and finally separating the sulphur from the solution.

HARTWELL CONDER.